Figure 1:
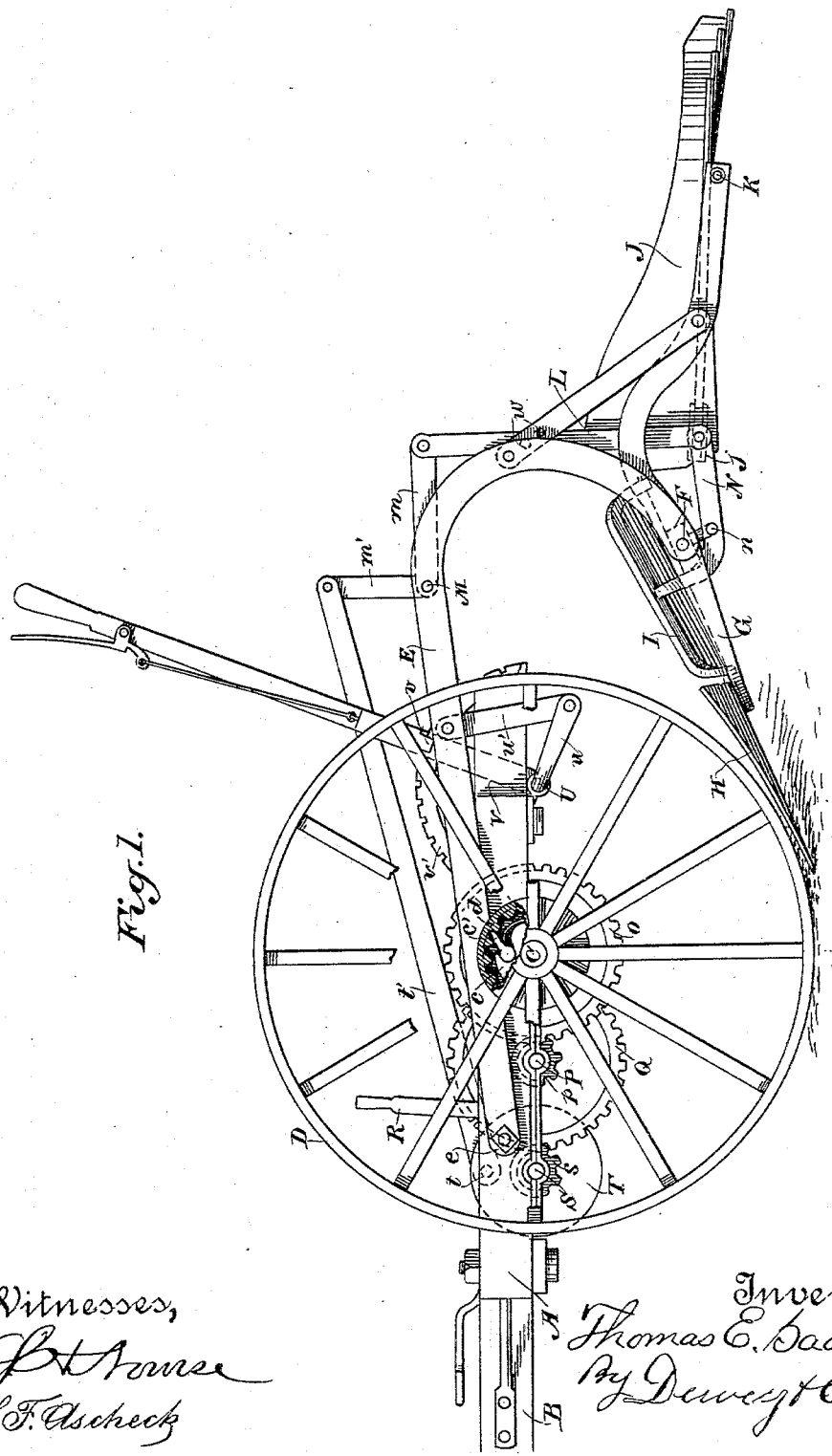

(No Model.)

T. E. SADLER.
POTATO DIGGER AND SEPARATOR.

No. 565,181. Patented Aug. 4, 1896.

Witnesses,
J. H. Rouse
H. F. Ascheck

Inventor
Thomas E. Sadler
By Dewey & Co.
Attys

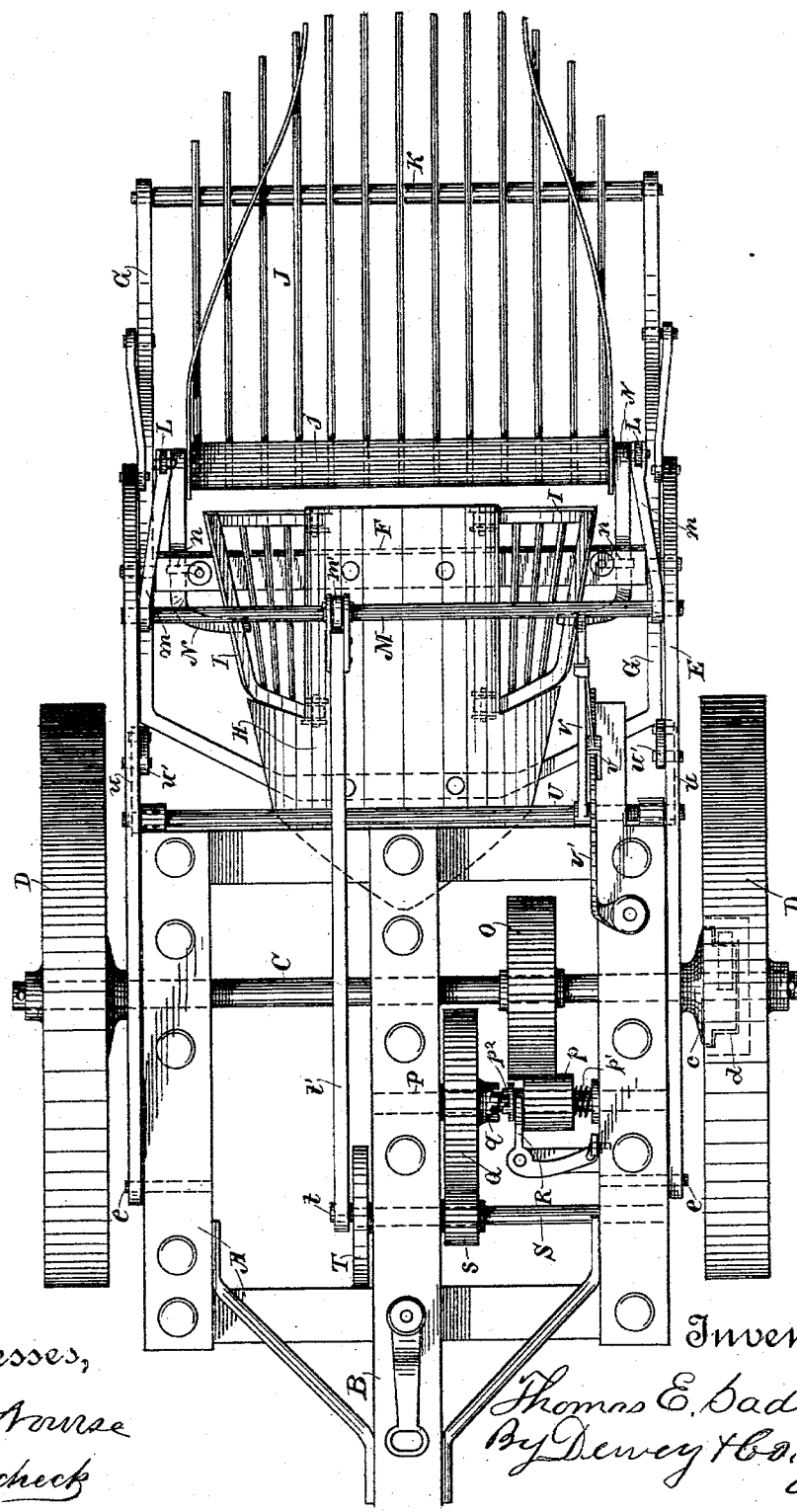

UNITED STATES PATENT OFFICE.

THOMAS E. SADLER, OF RENO, NEVADA.

POTATO DIGGER AND SEPARATOR.

SPECIFICATION forming part of Letters Patent No. 565,181, dated August 4, 1896.

Application filed March 4, 1896. Serial No. 581,745. (No model.)

*To all whom it may concern:*

Be it known that I, THOMAS E. SADLER, a citizen of the United States, residing at Reno, county of Washoe, State of Nevada, have invented an Improvement in Potato Diggers and Separators; and I hereby declare the following to be a full, clear, and exact description of the same.

My invention relates to the class of machines for digging potatoes and separating the earth therefrom whereby they are left clean; and my invention consists in the novel constructions, arrangements, and combinations of parts which I shall hereinafter fully describe and which relate particularly to the peculiar construction of shovel with its grating-wings, and in connection therewith of the peculiarly mounted and operating separator-grater, the means for communicating the proper motions to the shovel-wings and the separator-grater and other details combining to form a perfect, practical, and complete potato digger, harvester, and separator, which is the object of my invention.

Referring to the accompanying drawings, Figure 1 is a side view of my device. Fig. 2 is a top view of same.

A is the frame of the machine, having a suitable pole B and mounted upon an axle C.

D are the wheels, mounted upon the axle and adapted to communicate a rotary motion thereto by any suitable means, but more especially by the means which I shall presently describe.

Pivoted to the sides of the frame A at the points $e$ are the beams E, which extend backwardly and have their rear extremities downwardly bent or curved, as shown. In these extremities is carried a cross bar or shaft F, upon which are mounted arms G, to which and to the cross-bar is firmly secured the inclined shovel H. This shovel has a wide and properly-pointed front and a rearwardly-extending body, and it has pivoted on each side the grating-wings I. These consist of frames made up of parallel-spaced bars, and by their pivotal connection with the shovel they are adapted to vibrate in arcs in vertical planes on each side of the shovel-body.

J is the separator-grating, consisting of a tray the bottom of which is formed of rearwardly-extending parallel-spaced bars and the sides of which are raised to form a sufficiently-inclosed space to confine material deposited thereon. The rear portion of this grating lies freely and loosely upon a cross roller or bar K, extending between the rear extremities of the arms G, and the front end or cross-head $j$ of said grating is pivoted and carried in the lower ends of links L, the upper ends of which are connected with crank-arms $m$ of a rock-shaft M, which extends between and is journaled in the beams E.

Arms N are pivoted at $n$ under the cross-bar F, and the rear ends of said arms are pivotally connected with the cross-head $j$ of the separator-grating J, and their forward ends are bent upwardly and extend under the outer sides of the shovel-wings I, and upon these front ends of the arms said shovel-wings rest.

Now it will be seen that when the rock-shaft M is operated it will, through its cranks $m$ and the suspending-links L, lift the forward end or cross-head of the separator-grating J and vibrate it through an arc in a vertical plane, while by reason of the rear end of said grating being supported loosely upon the cross-roller K and its cross-head being pivotally connected with the links L said rear end of the grating will have a reciprocating motion over the roller, while its forward end has a vertical motion, and by these combined motions the grating will be vibrated in such a manner as to effect a separation of the earth from the potatoes, the former passing through between the bars of the grating, while the latter will be gradually worked down, by the reciprocating motion, over the tail end of the grating and deposited clean upon the earth. At the same time this movement of the separator-grating will, by swinging or vibrating the arms N, cause the forward ends of said arms to lift and allow to drop the side gratings or wings I of the shovel, which movement of said wings will assist in the preliminary separation of the earth from the potatoes.

Suitable mechanism may be employed to transmit the proper movement to the rock-shaft M, but the best mechanism is the one which I have here shown and consists of the gear O upon the axle C, said gear meshing with a pinion $p$, mounted and adapted to slide sidewise upon a feather on a small counter-shaft P, said pinion being controlled by a spring $p'$.

One end of the pinion has a clutch $p^2$, which is adapted to engage with a clutch-hub $q$ of a gear Q, which is loosely mounted upon the counter-shaft P.

A clutch-lever R engages a circumferential groove of the pinion-clutch and is adapted to throw the latter into and out of engagement with the clutch-hub of the gear Q. This gear Q engages with a pinion $s$ on a counter-shaft S, the inner end of which carries a crank-wheel T, with the wrist-pin $t$ of which a rod $t'$ is connected, the rear extremity of said rod being connected with a crank $m'$ of the rock-shaft M. Now when the clutches are in engagement the rotary motion of the axle is transmitted to operate the crank-wheel T, and through the connecting-rod $t'$ the rock-shaft M is operated to transmit the movements herewith described to the separator-grating and to the side wings of the shovel.

As I have said before, any suitable means may be employed by which the wheels will transmit a rotary motion to the axle, but I prefer the connections here shown, which will permit the reverse movement of the wheels and the backing up of the machine without affecting the power-transmitting mechanism, but which on the forward movement of the wheels and machine will transmit said movement. These connections consist of flanges or hubs $c$ on the axle, which carry a spring-controlled pawl or pawls $c$, adapted to engage in one direction with a ratchet-hub $d$ of the wheels and to slip said ratchet in the other direction.

The operating mechanism of the machine, comprising the shovel with its side wings and the separator-grating, being all carried by the rear ends of the beams E, it is only necessary, in order to raise the plow and other parts from the ground in moving from place to place and to lower the plow again to its work and regulate its depth in the ground, to raise and lower the beams, and to this end I have a rock-shaft U, journaled on the rear of the frame A, said shaft having end cranks $u$ connected by links $u'$ with said beams. This rock-shaft is operated by a lever V, having a handled pawl $v$ engaging with a segment-rack $v'$.

Now in order to vary the inclination of the shovel I have the cross-bar F, which extends between the rear extremities of the beams, journaled or pivoted in said extremities, so that it may rock, and I connect the arms G by links with the rear ends of said beams, so that the cross-bar F, when the links are in place, is held from rocking; but by having a series of holes $w$ in said links, whereby their point of connection with the beams may be varied, said links may be shortened or lengthened in order to change the position of the arms G, which is effected by the rocking of the cross-bar, and thus change the inclination of the shovel. This same adjustment of the arms will, by raising the rear cross-roller K, change or vary the inclination of the separator-grating.

The operation of the machine is as follows: The shovel being lowered and adjusted to its proper depth in the ground will dig up the earth and its contained potatoes, and cause both to travel upwardly to the upper end of the shovel. Some of the earth will be initially separated from the potatoes by the vibrating side grating-wings, and the remainder will pass on over the upper end of the shovel and wings onto the separator-grating behind. Thus by the movement of said grating the earth will be effectually separated and will drop through, while the potatoes will pass on over the tail end of the grating and fall down clean upon the earth.

Having thus described my invention, what I claim as new, and desire to secure by Letters Patent, is—

1. In a potato digger and separator, a shovel having grating-wings let into its sides and pivotally hung along their inner sides to the inner sides of said shovel.

2. In a potato digger and separator, a shovel having side grating-wings let into it and pivotally hung along their inner sides to the opposite sides of the shovel and means for vibrating said wings.

3. In a potato digger and separator, the combination of a wheeled frame, a shovel carried thereby, side grating-wings carried by the shovel and pivotally secured along their inner sides to the opposite sides of the shovel and power-transmitting mechanism from the main supporting-wheels of the frame whereby the side grating-wings are vibrated.

4. In a potato-digger, the combination of a shovel having grating side wings let into its opposite sides and hinged along their inner sides to the sides of the shovel, and a succeeding grating adapted to receive the earth and potatoes from said shovel and wings.

5. In a potato-digger, the combination of a shovel having longitudinally-hinged grating side wings, and a grating in rear thereof adapted to receive the earth and potatoes from said shovel and wings, and means for vibrating or shaking the shovel-wings and the succeeding grating.

6. A potato digger and separator comprising a wheeled frame, an inclined shovel carried thereby, longitudinally-hinged side grating-wings carried by the shovel, a transversely-hinged rear separator-grating adapted to receive the material from the shovel and wings, and power-transmitting mechanism from the main supporting-wheels for vibrating or shaking the side wings of the shovel and the separator-grating.

7. A potato digger and separator, comprising a wheeled frame, an inclined shovel carried thereby, longitudinally-hinged grating-wings carried by the opposite sides of the shovel, means for varying the inclination of the shovel, a separator-grating succeeding the shovel and adapted to receive the material therefrom, and the means for vibrating or shaking said grating, consisting of the links suspending the forward end of the grating, the rock-shaft with its cranks connected with said links, a gear on the axle, a gear loosely mounted on a counter-shaft in the frame, a pinion on said counter-shaft meshing with the gear on the axle, a clutch mechanism between the pinion and the loose gear on the counter-shaft, means for operating the clutch mechanism, a pinion engaging the loose gear, a crank operated by the pinion-shaft and a rod connecting said crank with a crank on the rock-shaft.

8. A potato digger and separator comprising a wheeled frame, an inclined shovel carried thereby, side grating-wings pivoted to said shovel, a separator-grating adapted to receive the material from said shovel and wings and the means for vibrating or shaking the separator-grating and the grating-wings of the shovel, consisting of the links connected with the forward end of the separator-grating, the pivoted arms also connected with said end of the grating and adapted to bear up under the wings of the shovel, a rock-shaft with its crank-arms connected with the links, and power-transmitting mechanism from the wheels for operating the rock-shaft.

9. A potato digger and separator, comprising a wheeled frame, rearwardly-extending beams pivoted to said frame, and means for raising and lowering said beams, a cross-shaft in the rear extremities of said beams, arms carried by said shaft, an inclined shovel secured to said arms and shaft, grating-wings pivoted to the shovel on each side thereof, a separator-grating following the shovel and having its rear end supported freely upon a cross bar or roller between the rear ends of the arms, and the means for vibrating or shaking said grating and wings consisting of the links connected with the forward end of the separator-grating, the pivoted arms also connected with said end of the grating and adapted to bear up under the wings of the shovel, a rock-shaft with its crank-arms connected with the links, and power-transmitting mechanism from the wheels for operating the rock-shaft.

10. A potato digger and separator comprising a wheeled frame, rearwardly-extending beams pivoted to said frame, a cross-shaft journaled or pivoted in the rear extremities of said beams, arms carried by said shaft, an inclined shovel secured to said arms and shaft, grating-wings pivoted to the shovel on each side thereof, a separator-grating following the shovel and having its rear end supported freely upon a cross bar or roller between the rear ends of the arms, means for vibrating or shaking said grating and wings, and the adjustable links connecting the arms with the beams whereby the inclination of the shovel and separator-grating is varied.

11. In a potato digger and separator, the combination, of a wheeled frame, an inclined shovel, longitudinally-hinged grating-wings carried by the opposite sides of the shovel and a rear grating, said wings and grating adapted to be vibrated, power-transmitting mechanism by which said wings and grating are operated, and the connection between the wheels and axle of the machine whereby the power-transmitting mechanism is operated, consisting of the flanges or hubs on the axle, carrying spring-controlled pawls, and the ratchet-hubs of the wheels with which said pawls engage in one direction and slip in the other.

In witness whereof I have hereunto set my hand.

THOS. E. SADLER.

Witnesses:
T. V. JULIEN,
H. A. WALDO.